US009741242B2

(12) United States Patent
Yang et al.

(10) Patent No.: US 9,741,242 B2
(45) Date of Patent: Aug. 22, 2017

(54) HANDHELD TERMINAL WITH INTEGRATED WIRELESS APPLIANCE CONTROL

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

( * ) Notice: Subject to any disclaimer, the term of this patent is extended or adjusted under 35 U.S.C. 154(b) by 0 days.

(21) Appl. No.: 14/673,452

(22) Filed: Mar. 30, 2015

(65) Prior Publication Data

US 2016/0240078 A1    Aug. 18, 2016

Related U.S. Application Data

(60) Provisional application No. 62/117,628, filed on Feb. 18, 2015.

(51) Int. Cl.
| | |
|---|---|
| *G05B 11/01* | (2006.01) |
| *G08C 19/16* | (2006.01) |
| *G08C 17/02* | (2006.01) |
| *G08C 23/04* | (2006.01) |

(52) U.S. Cl.
CPC ............ *G08C 17/02* (2013.01); *G08C 23/04* (2013.01)

(58) Field of Classification Search
CPC .................. G06F 8/65; G06F 19/3462; G06F 2203/04101; G06F 2203/04104; G06F 2203/04106; G06F 2203/04808; G06F 3/0235; G06F 3/041; G06F 3/0412; G06F 3/0416; G06F 3/044; G06F 3/04815; G06F 3/04845; G06F 3/0488; G06F 3/04883; G06F 3/04886; G06F 3/01
USPC ....... 340/12.5, 12.52, 12.22–12.29; 345/169, 345/172; 341/176; 348/114, 734, 725
See application file for complete search history.

(56) References Cited

U.S. PATENT DOCUMENTS

| | | | | |
|---|---|---|---|---|
| 6,211,856 | B1 * | 4/2001 | Choi et al. ................... | 345/666 |
| 6,791,467 | B1 * | 9/2004 | Ben-Ze'ev ................ | 340/12.25 |
| 6,912,429 | B1 * | 6/2005 | Bilger .................. | G08B 25/008 |
| | | | | 236/49.3 |
| 7,237,029 | B2 * | 6/2007 | Hino et al. .................... | 709/227 |
| 7,933,945 | B2 * | 4/2011 | Krzyzanowski et al. .... | 709/200 |
| 8,098,140 | B1 * | 1/2012 | Escobosa et al. ......... | 340/12.28 |
| 8,380,359 | B2 * | 2/2013 | Duchene et al. ............ | 700/295 |
| 2002/0173339 | A1 * | 11/2002 | Safadi ....................... | H03J 9/00 |
| | | | | 455/553.1 |
| 2004/0181622 | A1 * | 9/2004 | Kiser et al. .................... | 710/72 |

(Continued)

FOREIGN PATENT DOCUMENTS

NL    WO 0195283 A2 * 12/2001 ............ G08C 17/02

*Primary Examiner* — Emily C Terrell
(74) *Attorney, Agent, or Firm* — Michael Best & Friedrich LLP

(57) ABSTRACT

Disclosed is a terminal that integrates control of multiple appliances, where a corresponding control interface is provided in response to a physical design feature of the terminal. For example, in some cases the physical design feature may be a toggle switch, a pop-up button, or a deformable region of a flexible display. In this way, in response to activation of a physical design feature of a device, a user may use a single control interface integrating controls for multiple appliances to easily, immediately, and seamlessly control multiple different appliances.

4 Claims, 16 Drawing Sheets

(56) References Cited

U.S. PATENT DOCUMENTS

| | | | |
|---|---|---|---|
| 2005/0024328 A1* | 2/2005 | Oldfield | G06F 3/04886 345/157 |
| 2005/0030292 A1* | 2/2005 | Diederiks | G09B 21/003 345/173 |
| 2008/0068207 A1* | 3/2008 | Elberbaum | G08C 17/02 340/13.25 |
| 2009/0121842 A1* | 5/2009 | Elberbaum | G08C 17/02 340/10.5 |
| 2009/0156251 A1* | 6/2009 | Cannistraro et al. | 455/557 |
| 2011/0291971 A1* | 12/2011 | Masaki et al. | 345/173 |
| 2013/0215069 A1* | 8/2013 | Lee | G06F 1/1626 345/173 |
| 2014/0249681 A1* | 9/2014 | Yamaguchi et al. | 700/276 |
| 2016/0299540 A1* | 10/2016 | Kim | G06F 1/1616 |

\* cited by examiner

HANDHELD TERMINAL WITH INTEGRATED WIRELESS APPLIANCE CONTROL

This application claims priority to U.S. Provisional Application No. 62/117,628, filed Feb. 18, 2015, which is hereby incorporated by reference in its entirety.

BACKGROUND

Technical Field

This disclosure relates generally to a handheld terminal integrated with physical design features for wireless control functionality of various electronic appliances.

Description of the Related Art

As wireless communication capabilities become integrated into more and more appliances, a user is presented with an increasing and disjointed number of ways of controlling these appliances. In other words, most appliances that have been updated to become "smart" provide their own, often proprietary, control interface, such as through an application installed on a mobile device, or a physical control device. For example, for a smart thermostat in a home, a user uses a dedicated application that only controls the thermostat for making changes to the smart thermostat. However, these present solutions result in a situation where a user may need to access as many mobile device applications, or manipulate as many control devices, as there are appliances to be controlled.

SUMMARY OF EMBODIMENTS

With respect to the above problems, the utility model aims to provide a complete set of solutions to provide a physical design feature of a device configured to launch an integrated control interface for controlling multiple, different, appliances in an immediate, easy, and seamless way. Specific technical schemes are as follows.

A terminal or device equipped with a button or other input mechanism on a shell or display of the terminal or device that may signal an appliance control component that provides a control interface such that the control interface may provide an interface of command controls corresponding to different appliances. Further, the control interface may receive a command that corresponds to a particular appliance from among multiple appliances, and determine a format or protocol of a transmission signal that corresponds to the particular appliance. The appliance control component may then transmit a message to the particular appliance, where the message transmitted is consistent with a wireless protocol implemented on the particular appliance, and where the message at least indicates the command received and/or in addition to other user-selected commands and/or in addition to commands generated from the appliance control component.

In some embodiments, an appliance control component may operate in conjunction with an appliance control wireless peripheral, where the appliances receive control commands from wireless signals from the appliance control wireless peripheral, and where the appliance control wireless peripheral may be controlled from the appliance control component.

In some embodiments, a removable physical device or removable function module may be configured to implement an appliance control component, where the removable physical device may be attached as a peripheral to a terminal or device. In some example, the removable function module may include a power supply and a data exchange interface.

In some embodiments, with an appliance control wireless peripheral, where the appliances receive control commands from wireless signals from the appliance control wireless peripheral, and where the appliance control wireless peripheral may be controlled from the appliance control component.

An example device may include a touchable screen, a flexible screen, removable hardware components, audio devices, memory, one or more different kinds of physical input features configured to interface with an appliance control component, and one or more computer processors.

Example wireless protocols supported may be Wi-Fi, Bluetooth, Infrared Radiation, near field communication (NFC), or any other wireless protocol implemented on a given electronic appliance.

Figure 1A:
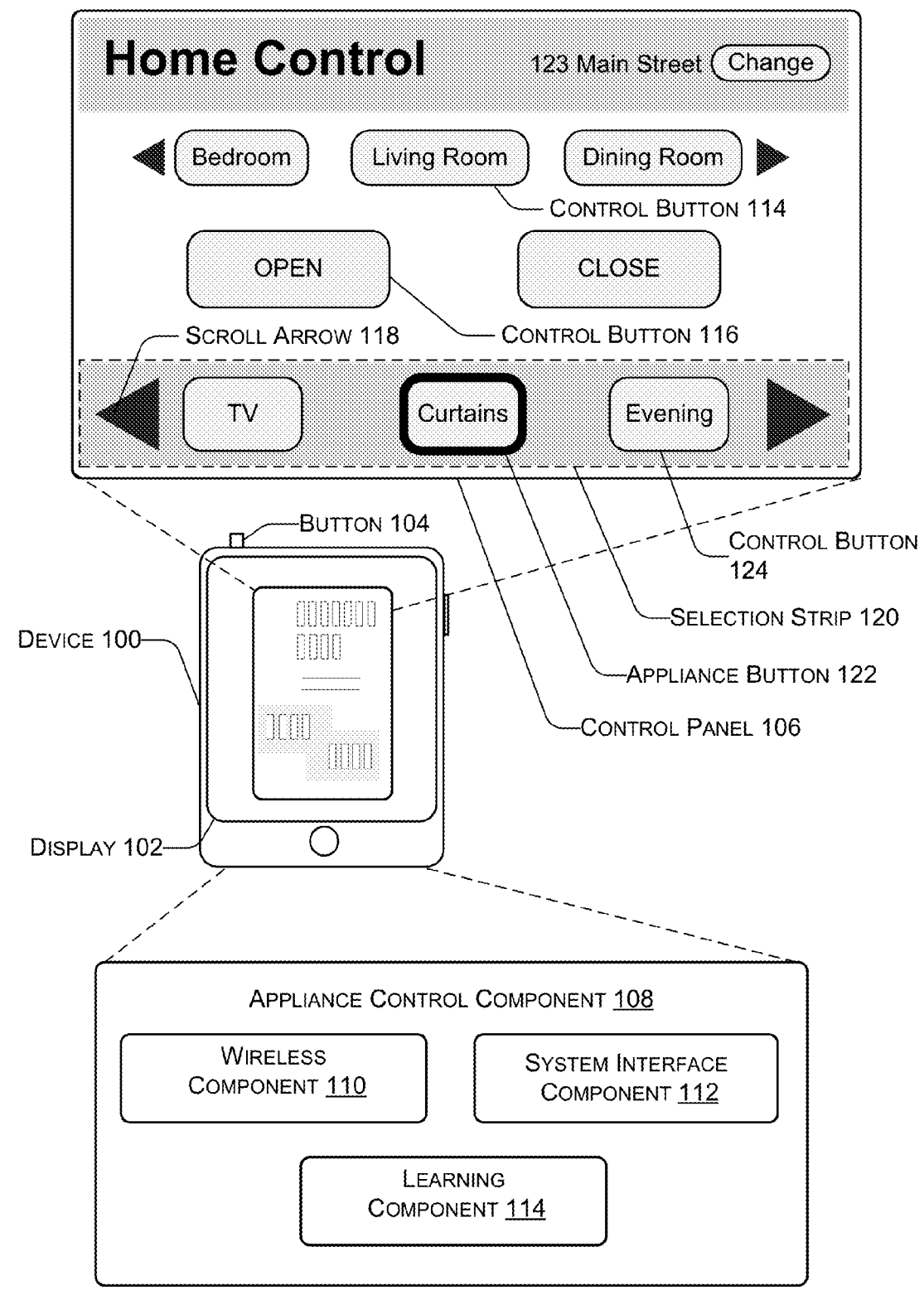
FIG. 1A is a diagram of a device including a physical design feature to interface with an appliance control component that provides an integrated control panel for controlling multiple appliances.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

The techniques and systems described are directed to various implementations of an appliance control component and a device designed to implement a physical input mechanism that is interfaced with the appliance control component. In this way, a device, through activation of a the physical design feature on the device, may immediately launch a control interface for controlling one or more appliances—in some cases without a user navigating through any layers of a device operating system. For example, if a device is in a dormant state and a display screen of the device is blank, then activation of the physical input mechanism may result in invocation of the appliance control component, which may then display a control interface for controlling one or more appliances without any prior display of user interface elements of an operating system for the device.

In some implementations, in response to activation of a physical input mechanism such as a button on a shell of a device, an appliance control component may be directly invoked to provide a user with functionality for control features corresponding to multiple different appliances through a single, integrated, control interface. In this way, with a single activation of a physical input mechanism on a mobile device, a user may immediately and seamlessly invoke a control interface of an appliance control component that allows a user to wirelessly control one or more appliances. In some cases, the appliance control component may detect and respond to sound and/or voice commands.

In some implementations, an appliance control component may detect and collect data analytics with regard to use of the appliances controlled with the appliance control component. For example, an appliance control component may record each interaction a user has with different control options, such as inputs provided to a TV, stereo, lighting system, curtain system, or any other type of appliance. In this way, the appliance control component may infer patterns of use for a single appliance or for a combination of appliances, and based on the patterns of use, the appliance control component may determine rules. For example, if a user frequently turns off a stereo system during a window of time in which a TV is turned on, then the appliance control component may determine a rule to turn off the stereo system in response to a user selecting to turn on a TV through a control panel of the appliance control component. Other examples are discussed below.

In some implementations, the appliance control component may provide security features such as asking for authentication information during a registration or configuration phase. For example, when the appliance control component is initially invoked, a user may be presented with options to scan for different appliances and to provide authentication information such as a password, voice verification, biometric information, or some other type of authentication.

FIG. 1A illustrates a device 100 including a physical design feature, in this case button 104, and an appliance control component 108 that provides an integrated control panel 106 for controlling one or more appliances. Appliance control component 108 may include a wireless component, such as wireless component 110, for transmitting and receiving wireless signals, and may further include a system interface component, such as system interface component 112, which may communicate with a physical design feature of the device and which may interface with a device operating system. Appliance control component 108 may also include a learning component, such as learning component 114, which may provide features related to identifying patterns of appliance usage and inferring and determining patterns of behavior and corresponding rules.

In this example, the physical design feature is a pop-up button, button 104, that may, when pressed in a depressed state, pop-up, and that may, when pressed in a pop-up state, depress and stay depressed. Further, in some embodiments, the pop-up button may include, within a body of the pop-up button, a transmitter and/or receiver. In some example, the pop-up state may correspond to activation of the button, where the activation serves to activate the appliance control component. In this way, activation of the appliance control component may correspond to the pop-up button being extended, which may provide improved transmission and/or reception capabilities of the pop-up button. In other words, in response to the pop-up button being extended, and when an appliance implements an infrared wireless protocol, an infrared lamp emitting angle may be increased.

In this example, if pop-up button 104 is in a depressed state, then activation or depression of pop-up button 104 may pop-up button 104 and result in pop-up button 104 being in a pop-up state. Further in this example, activation of pop-up button 104 may generate an interrupt signal that may be transmitted to an operating system of device 100. For example, the operating system of device 100 may specify or define an interrupt signal to correspond to appliance control component 108 such that when the operating system receives the interrupt signal, the operating system directly invokes appliance control component 108.

For example, a device may be in a dormant or sleep mode, and in this mode, a user may depress button 104. In response to detecting activation of button 104, device 100 may be transitioned out of the dormant or sleep mode and appliance control component 108 may be launched, where appliance control component 108 may provide control panel 106 displayed within display 102 of device 100. In some cases, appliance control component 108 may be launched directly in response to activation of button 104—without a user seeing and/or navigating through any layers or interfaces of an operating system installed on device 100. In this way, in direct and immediate response to activation of the physical design element of device 100, a user may be presented with control panel 106 allowing a user to—from a single interface—seamlessly control and interact with multiple different appliances.

In this example, control panel 106 depicts options for selecting from among multiple appliances, including an alarm system, a TV, and curtains, where these different appliances correspond to the residence at "123 Main Street." While control panel 106 depicts options for selecting between three appliances, "TV", "Curtains", and "Lights", any number of appliances may be controlled through control panel 106. For example, while not depicted, scroll arrow 118 may allow a user to view other appliances options. Further, when a particular appliance is selected in the appliance selection strip 120, such as the curtains appliances, which corresponds to appliance button 122, a user may see the control options for a selected appliance.

In some embodiments, instead of a user selecting a user interface element of control panel 106, the user may speak a voice command, such as "shut the curtains and turn on the TV." In general, a user may speak any command or commands that may otherwise be provided to the appliance control component through the control panel. In other embodiments, instead of performing an auditory analysis of spoken commands, the appliance control component may use a camera integrated with the device to visually analyze lip and/or mouth movements to, in effect, lip read the commands directed to the appliance control component. In other embodiments, a combination of visual analysis of mouth movements and an analysis of spoken, auditory information may be used to increase the confidence that a particular command has been spoken. In other words, if a spoken command is determined to be unclear and with two or more possible interpretations, using an analysis of visual lip movements may serve to select among the possible interpretations.

In some embodiments, a user may opt to change the residence for appliances to control with a "Change" button, depicted near a display of an address for the residence at the top of control panel 106. In some cases, a user may configure appliance control component 108 to store one or more passwords or settings corresponding to one or more appliances at a particular residence, or at multiple different residences. Further in this example, the main display area for control panel 106 includes controls corresponding to the "Curtains" appliance. Given these controls, a user may, for example, touch a control button 114 for "Living Room" and then touch a control button 116 to "OPEN" the curtains.

In a similar manner, a user may select different appliances from selection strip 120, and for a given selected appliance, the appliance control component may display a corresponding command interface with controls for controlling various features of the selected appliance. Further, in response to detecting activation of a specified control and control operation within a currently displayed control interface for a currently selected appliance, the appliance control component may transmit a command to the appliance that corresponds with the selected command, and where the transmission to the selected appliance is in accordance with one or more wireless protocols and message formats corresponding to the selected appliance.

In some embodiments, an appliance control component may determine appliance control rules using learning component 114. For example, if a user repeatedly selects a set of multiple appliance control commands within a threshold amount of time, the appliance control component may determine that the set of multiple appliance control commands may be grouped together to be performed at substantially the same time.

For example, if a user repeatedly uses the appliance control component to close curtains and then turn on lights, or repeatedly uses the appliance control component to turn on lights and then close curtains, and these commands occur in the evening, then the appliance control component may determine a corresponding rule.

In some embodiments, the appliance control component may determine a rule that if, after sunset or after 6 pm, a user invokes the appliance control component to close the curtains, then the appliance control component, without the user selecting the "Lights" appliance control, may transmit a command to the lights appliance control to turn on the lights. In this way, according to the determined rule, if a user invokes the appliance control component to turn on the lights, and the time is after a specified time, then the curtains are also closed—where the appliance control component closes the curtains without the user specifically selecting a close curtain command.

As another example, it may be the case that a user repeatedly performs the commands of: (1) turning on the television to a college football game, (2) muting the television, (3) turning on the radio, and (4) tuning the radio to a sports broadcast station broadcasting color commentary for the college football game. In this example, the appliance control component may identify the content of the television program, for example, by a semantic analysis of the program guide for the selected channel broadcasting the college football game. Further in this example, based on the content of the broadcast, in this case a college football game, the appliance control component may determine a rule to be: "if television content matches a college football game, then mute the television, turn on the stereo, and tune the stereo to station X", where X may be the determined station as part of the set of commands determined earlier.

In other words, in general, a determined rule or set of commands may be determined on the commands issued to one or more appliances in addition to content being provided by the one or more appliances.

Generally, any set of repeated commands received within a threshold amount of time may be used to infer different commands as part of a set or rule, where parameters of the rule may further depend, at least in part, on a time of day, geolocation, or a combination of time and location.

In some embodiments, the appliance control component may provide a user a new user interface element corresponding to a set of commands. For example, the appliance control component may create a control button within a selection strip such as selection strip 120, where the control button represents the determined rule. In this example, the appliance control component may create "Evening" control button 124 corresponding with the two appliance control commands of closing the curtains and turning on the lights. In different cases, the appliance control component may allow the user to re-arrange the control buttons presented within selection strip 120. For example, a user may use a gesture, such as press-and-hold, over a given control button, and when the appliance control component modifies the display of the control button to indicate that the control button is selected and available to be moved, the user may drag the control button to a new position. In some cases, the appliance control component may indicate that a control button may be moved by modifying the display of the control button to be altered, such as by displaying the control button as slightly moved, or slightly altering the colors, or through some other alteration of the visual characteristics of the display of the control button.

Figure 1B:
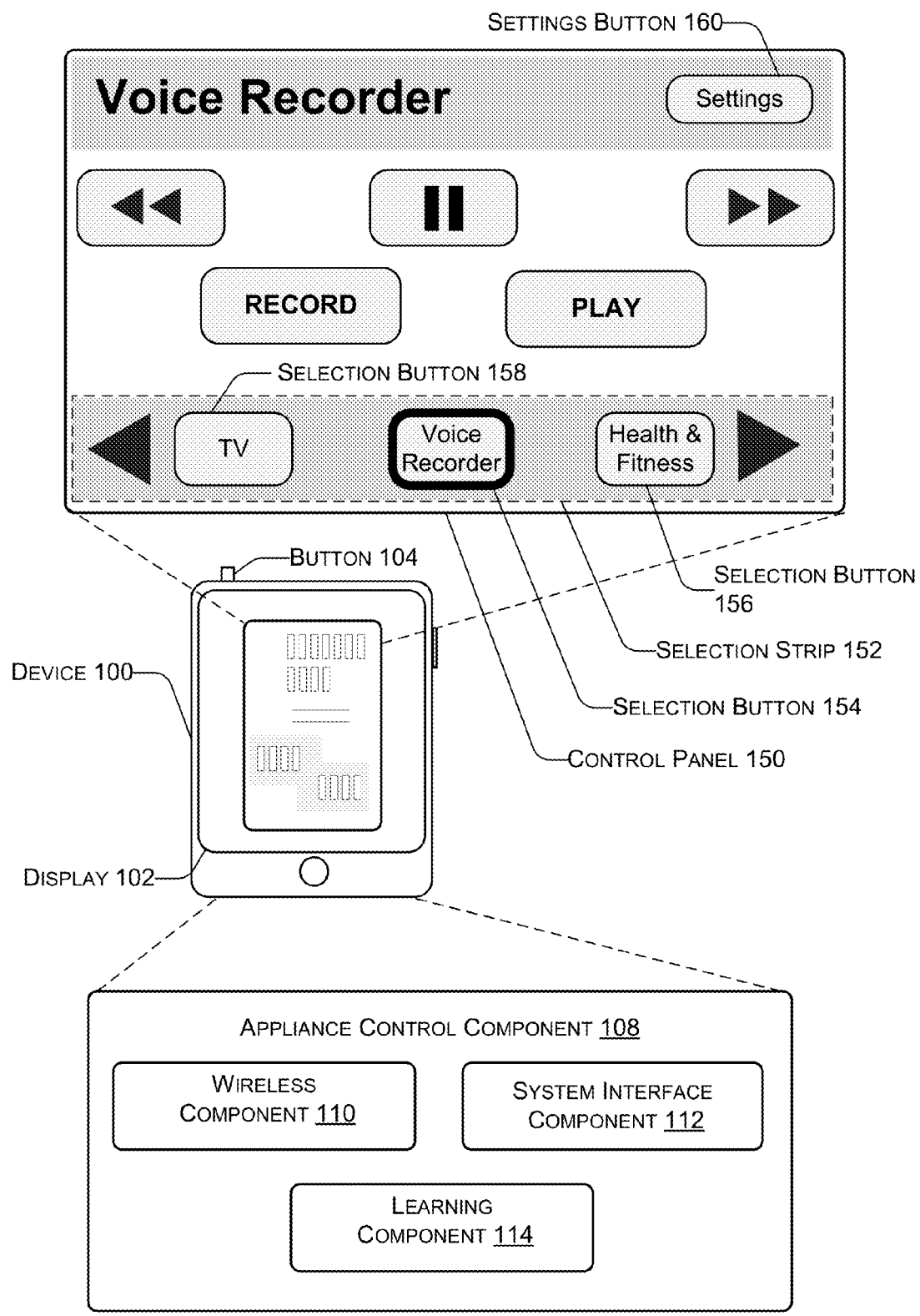
FIG. 1B is a diagram of a device including a physical design feature to directly invoke one or more functional features.

FIG. 1B illustrates device 100 including a physical design feature, button 104, and an appliance control component 108 that is invoked in response to activation of the physical design feature, where the appliance control component directly provides one or more functional features and/or one or more applications. In some cases, the one or more applications may be local applications installed on the computing device implementing the appliance control component, and in other cases, the one or more applications may be remote, or cloud service, applications, or a combination of local and remote applications.

For example, in contrast to the "Home Control" control interface provided in FIG. 1A, the appliance control component 108 may also be configured to provide a control interface for a given application installed on device 100, for example, a locally installed health and fitness application. In other cases, appliance control component 108 may itself provide one or more functional features that may be directly invoked in response to activation of a physical design feature on the computing device implementing the appliance control component. For example, one such functional features includes a voice recording feature, and a control interface for a voice recorder is depicted in FIG. 1B.

In some implementations, appliance control component 108 may provide a control interface for a single function or application. However, in other cases, appliance control component may provide a control interface that allows a user to navigate between multiple different functions and applications, including, as depicted in control panel 150, a combination of external appliance controls and functions and/or applications. For example, as depicted in control panel 150, control buttons are displayed for a voice recorder, which correspond to a selection within selection strip 152 of the "Voice Recorder" selection button 154. As seen in this example, selection strip 152 includes buttons for a user to select between a combination of control interfaces for appliances, such as selection button 158, which corresponds to a "TV" appliance, and applications, such as selection button 156, which corresponds to a "Health & Fitness" application.

In some implementations, a user may change a default application or feature that is presented in control panel 150. For example, a user may select selection button 156, and a control interface for a "Health & Fitness" may be displayed within control panel 150. Further, in some cases, for future invocations of the appliance control component, the appliance control component may provide a control interface for the last, or more recently selected feature, application, or appliance control. This default functionality may allow a user to keep a preferred feature, application, or appliance control, to be displayed each time the appliance control component is invoked. In other cases, a user may select, for example through settings button 160, default behaviors or default control panels.

In this way, similar to other implementations of the appliance control component, a user may, through an activation of a physical design element on a computing device, a user may invoke a control interface for one or more functional features.

Figure 2A:
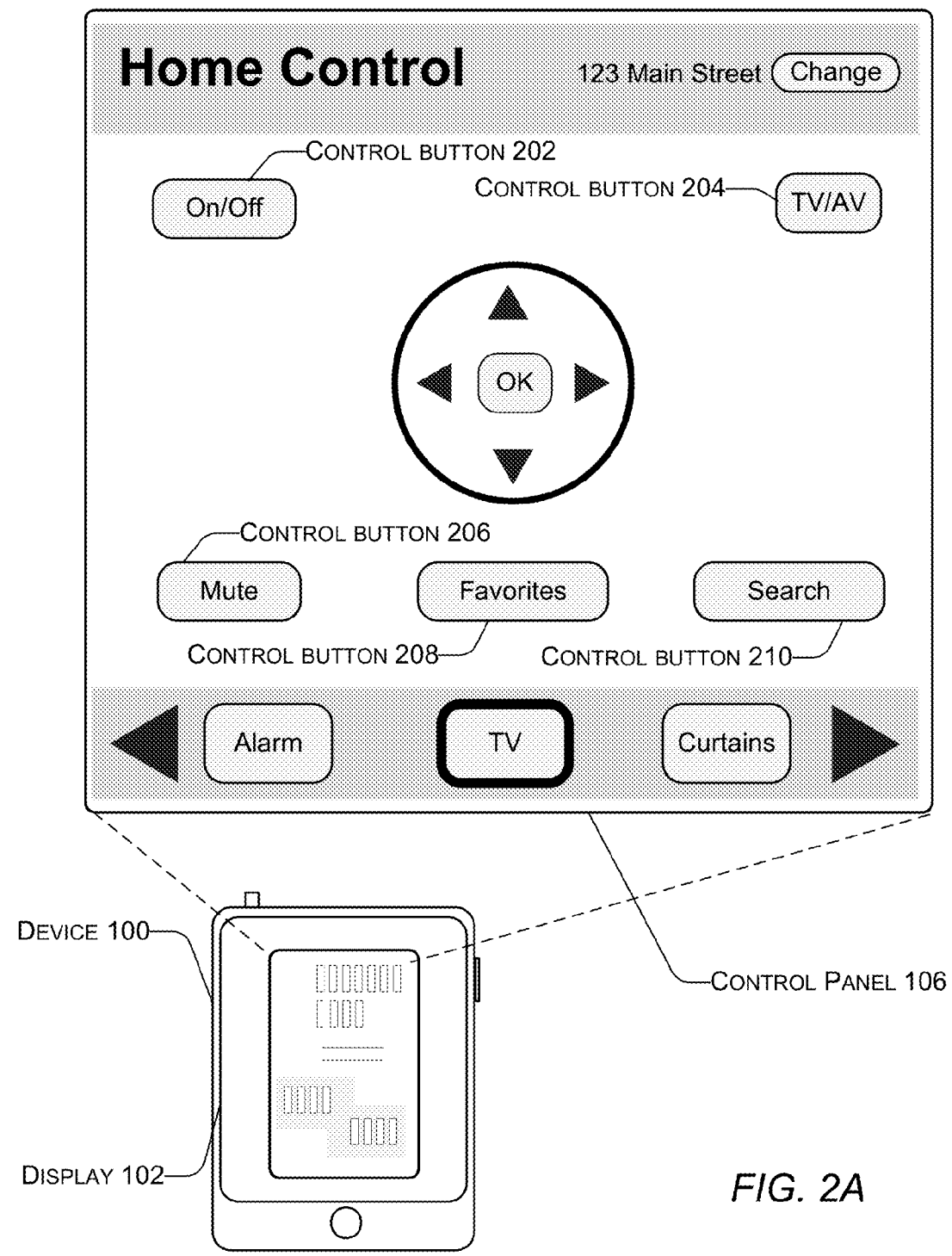
FIG. 2A illustrates an example control interface for scrolling through control settings for multiple appliances.

FIG. 2A illustrates control panel 106 where a selected appliance is "TV", and where the displayed control buttons correspond to different features a user may control for the selected appliance. For example, a user may turn the television on or off using control button 202, change inputs to the television using control button 204, mute the television using control button 206, select favorite channels using control button 208, and search through a program guide using control button 210, among any other features that the appliance may provide. In some embodiments, a user may re-arrange the position of any of the control buttons, for example, the appliance control component may detect a press and hold gesture as applied to a given button, and in response, the appliance control component may allow the user to drag and drop the given button in another location of the displayed control interface. In other cases, a user may add or remove other control buttons.

In some cases, a user may combine the functionality of different buttons. For example, it may be default functionality of a television that when a user is watching a particular television channel and selection of a "Search" function allows a user to search for other television content, but where the default functionality of the television is to keep playing the sound and portions of the current content. In this example, the user may prefer to mute the television while the user is searching.

To this end, the user may touch and hold "Mute" control button 206, and after the appliance control component determines that the user intends to modify the control interface, the appliance control component enables the user to drag the "Mute" control button 206—the user may then drag the "Mute" control button 206 on top of "Search" control button 210. In response to the release of the "Mute" control button 206 on top of "Search" control button 210, the appliance control component may redefine the functionality of the "Search" control button 210 to add the functionality of the dragged-on button, in this example, "Mute" control button 206. In this example, the appliance control component modifies the functionality of "Search" control button 210 to, when a user selects "Search" control button 210, also perform the functions of the "Mute" button—thereby allowing a user to search for new content in silence and without the distraction of a currently selected television channel. In a similar manner, a user may combine functionality of one or more different ones of the controls of the control interface.

Figure 2B:
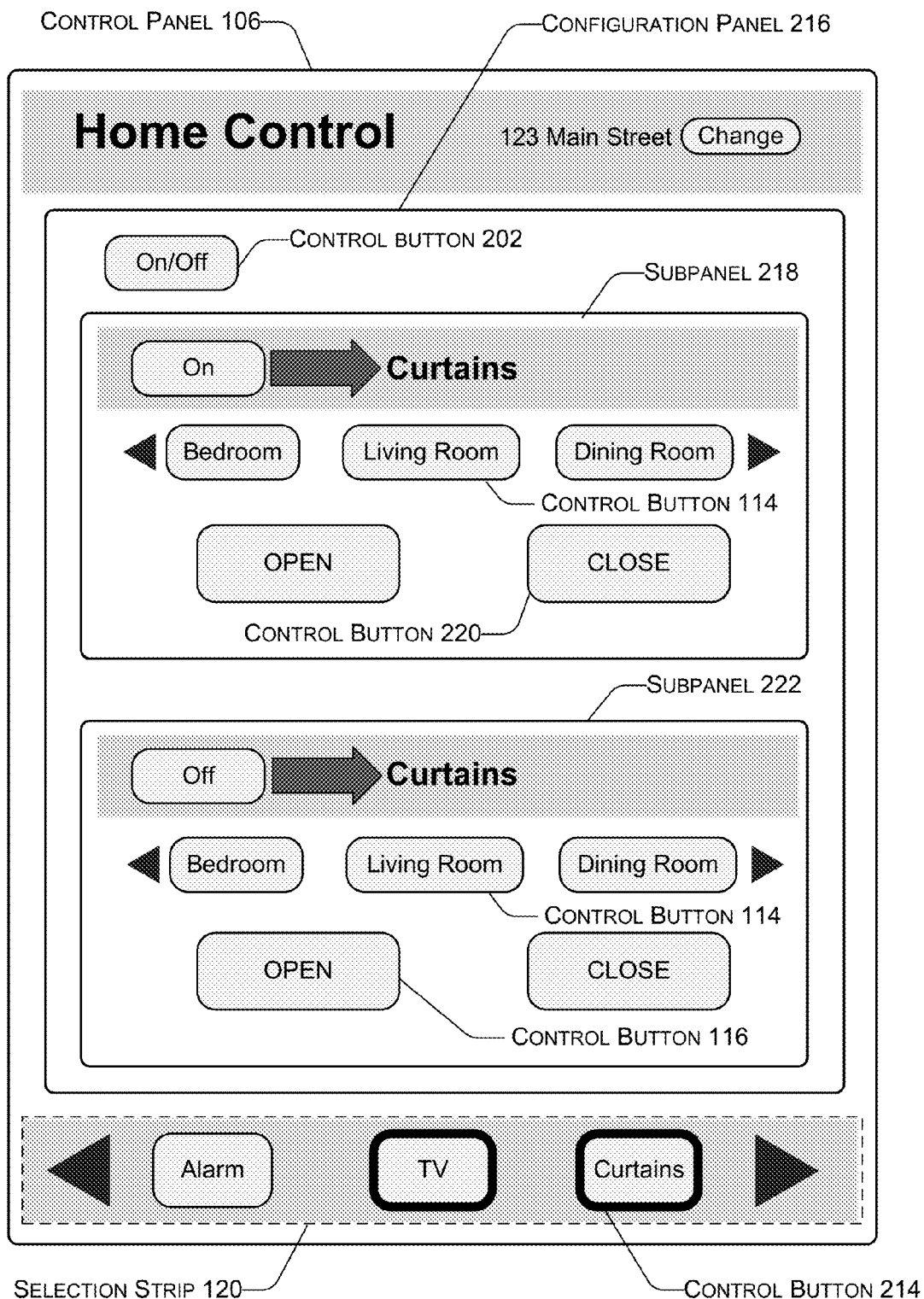
FIG. 2B illustrates an example control interface for associating controls from one appliance with one or more controls of another appliance.

FIG. 2B illustrates control panel 106 where a selected appliance is "TV", and where a user may combine functionality from different appliance controls. For example, the appliance control component may recognize a drag-and-drop gesture of an appliance from selection strip 120 onto a control button of a currently active control interface for another appliance. In other examples, a user may drag and drop a given appliance control button from the selection strip onto another appliance control button within the selection strip, where in response the appliance control component may generate an interface for enabling a user to combine functionality of the different appliances.

In this example, a user may currently have selected a control interface corresponding to "TV" control button 212, and part of the control interface for the television is "On/Off" control button 202. Further, a user may touch and hold down "Curtains" control button 214 until the appliance control component modifies the display of "Curtains" control button 214 to indicate that the control button is now selected and may be manipulated or moved. In some cases, a selection of the television appliance may be indicated by highlighting the display of the control button, for example, by changing color or thickening the icon lines, or through some other visual indication of selection.

The user may then drag "Curtain" control button 214 on top of "On/Off" control button 202, and in response, the appliance control component may provide a configuration panel such as configuration panel 216 with options for control actions to be taken with regard to the dragged-on appliance, in this case control of curtains. In some cases, this additional selection may be indicated by highlighting the display of the control button for the curtains in addition to maintaining the highlighting for the television appliance. For example, the additional selection of the curtains may be indicated by changing color or thickening the icon lines, or through some other visual indication of selection. In this example, configuration panel 216 may present options to be taken with regard to the other appliance, the curtains appliance, that correspond to control options for the currently selected appliance, the television appliance.

For example, subpanel 218 may provide curtain control options to be associated with an "On" control selection of the television appliance. In this case, in response to the user selecting "Close" control button 220 and "Living Room" control button 114, within subpanel 218, the appliance control component may associate an "On" control selection of the television appliance with a "Close" control selection of the curtains appliance for the living room curtains.

Similarly, subpanel 222 may provide curtain control options to be associated with an "Off" control selection of the television appliance. In this case, in response to the user selecting "Open" control button 220 and "Living Room" control button 114, within subpanel 222, the appliance control component may associate an "Off" control selection of the television appliance with an "Open" control selection of the curtains appliance for the living room curtains.

In other example, different combinations of appliances with given control buttons of another appliance may be selected and a similar control panel associating controls of one appliance with controls of another appliance may be presented.

Figure 3:
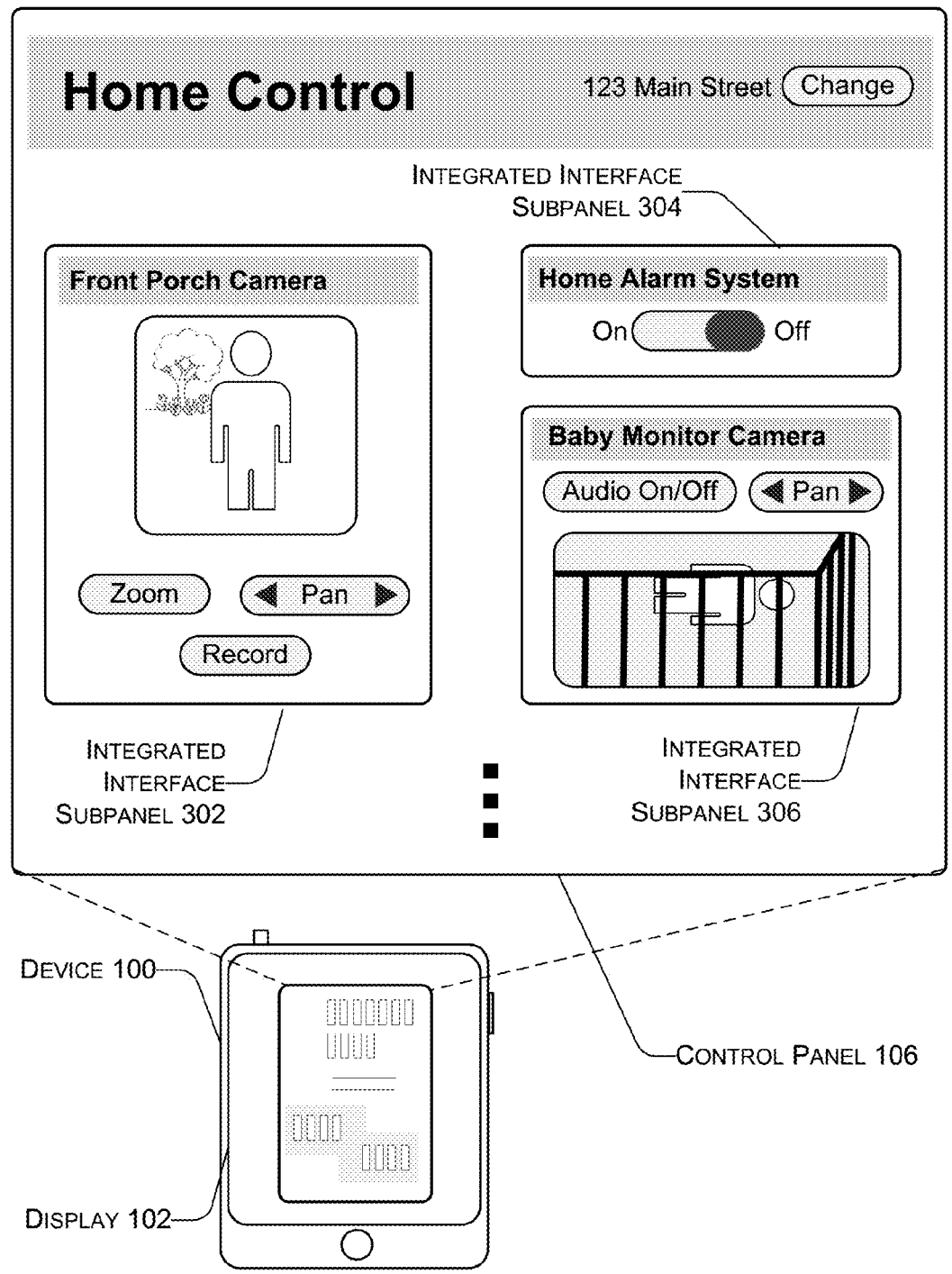
FIG. 3 illustrates a control interface that integrates interface features and output of multiple appliances.

FIG. 3 illustrates control panel 106 with multiple, integrated interfaces for multiple appliances. In this example, integrated interface subpanel 302 provides control functions corresponding to a front porch camera, including an image provided by the front porch camera and control buttons for controlling the camera. In other words, at a top level of the control interface of control panel 106, a user may simultaneously see and have the option to modify, inputs from multiple different appliances.

In this example, integrated interface subpanel 302 may be displayed concurrent with integrated interfaces for other, different appliances at the same time. For example, integrated interface subpanel 302 may be displaying current inputs from the front porch camera, and simultaneously display current inputs from a home alarm system, as depicted in integrated interface subpanel 304, or from a baby monitoring system, as depicted in integrated interface subpanel 306.

In other implementations, the appliance control component may include different numbers or different combinations of appliance control within various corresponding integrated interface subpanels. Further, within a given integrated interface subpanel, a user may directly control any controls of a given integrated interface subpanel.

For example, the appliance control component may access metadata associated with each of the integrated appliances, and based on the metadata, the appliance control component may determine pairs or groups of appliances and generate a control interface such that the pairs or groups of appliance control interface are displayed next to, near, or proximate to one or more of the other appliance control interfaces in the group. As one example, the front porch camera appliance may have metadata describing a location within a house where the appliance is installed, and an appliance that includes controls for front porch lights may also have metadata describing a location where the lights are installed. In the case that the metadata specifies that the location information is the same, or within a threshold distance of each other, the appliance control component may determine to group appliances according to installation location, and present the user interface controls for these similarly located appliances proximate to each other in the control interface. In some cases, other metadata may also be used to determine pairs or groupings.

Further, in some cases, the display of the controls for the grouped or paired appliances may indicate that the appliances are grouped, for example, displaying the grouped or paired appliances within a same subpanel of the control interface.

Figure 4:
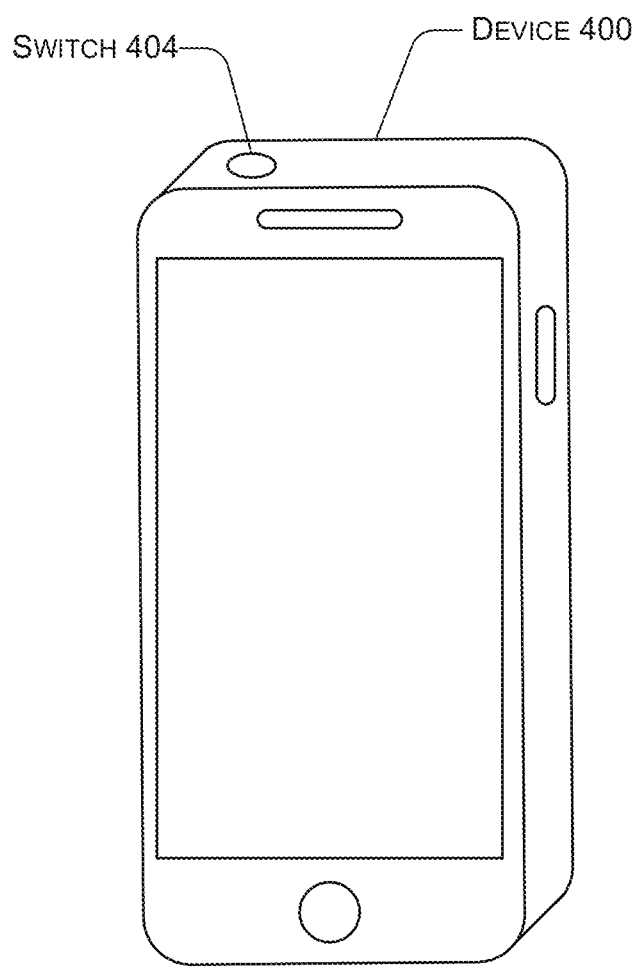
FIG. 4 is a diagram of a device including an infrared toggle switch.

FIG. 4 illustrates an example device 400 where the physical design feature on a shell of device 400 is an infrared toggle switch 404, which may generate an activation signal. The switch may be different sizes, shapes, or positioned on different parts of device 400. This activation signal may be received when device 400 is in either a dormant or active mode. In other example, the physical design element of a device may take different forms and shapes.

For example, if a user is currently interacting with an operating system on device 400, depression of toggle switch 404 may activate the appliance control component such that the appliance control component becomes the active process in the operating system, and where the control panel replaces any currently operating process or application. However, in some cases, while a status of a currently operating process or application may be changed to be a background process, the background processes may continue to execute. For example, if prior to activating toggle switch 400, the user is on a phone call, then during the phone call, in response to activation of toggle switch 400, the appliance control component may change the display to display the control interface instead of the interface for the telephone features—while the telephone call is maintained. Similarly, the status of other applications that may be currently occupying a display with a respective user interface, may be changed to be in the background while maintaining the processing state of the given application.

Further, if device 400 is currently in a dormant state, then depression of toggle switch 404 may transition device 400 directly from the dormant state to an active state with the appliance control component being the active process. In this way, in direct response to a physical design element of the device, the appliance control component may become immediately available for a user to control one or more appliances.

Figure 5:
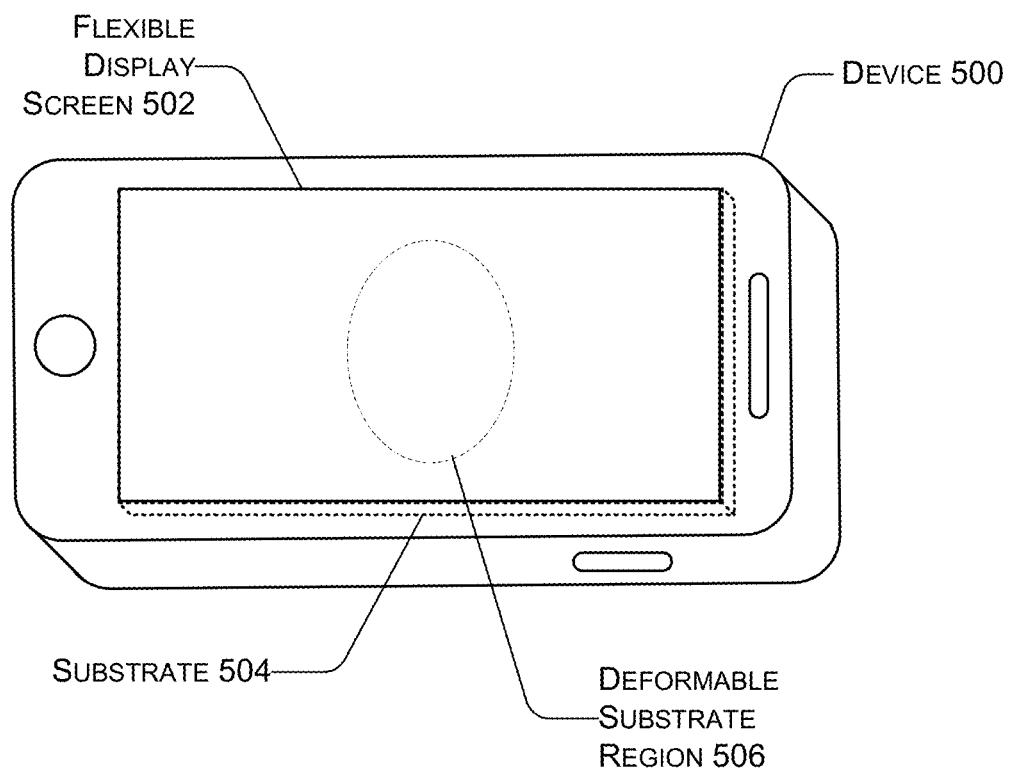
FIG. 5 is a diagram of a device including a flexible display screen providing a deformable region that may be depressed to activate a button included in a substrate of the flexible display screen.

FIG. 5 illustrates an example device 500 configured with a flexible display screen 502 that may bend or flex in response to pressure from a touch. Further in this example, the flexible display screen may be mounted on a substrate such as substrate 504 that includes a deformable substrate region 506, that in response to the user pressure on flexible display screen 502, may activate a button or switch that may provide an interrupt or activation signal to invoke the appliance control component.

This interrupt or activation signal may be received when device 500 is in either a dormant or active mode. For example, if the user is currently interacting with an operating system on device 500, depression of flexible display screen 502 in the region corresponding to deformable substrate region 506 may activate the appliance control component such that the appliance control component becomes the active process in the operating system, and where the control panel replaces any currently operating process or application. However, in some cases, the replaced process or applications do not become inactive, but rather, the replaced process or applications may continue executing in the background and may maintain and continue the processing state that existed prior to the appliance control component becoming the currently displayed application.

Similarly, if device 500 is currently in a dormant state, then depression of flexible display screen 502 in the region corresponding to deformable substrate region 506 may transition device 500 directly from the dormant state to an active state with the appliance control component being the active process. In this way, in direct response to activation of a physical design element of the device, the appliance control component may become immediately available for a user to control one or more appliances.

Figure 6:
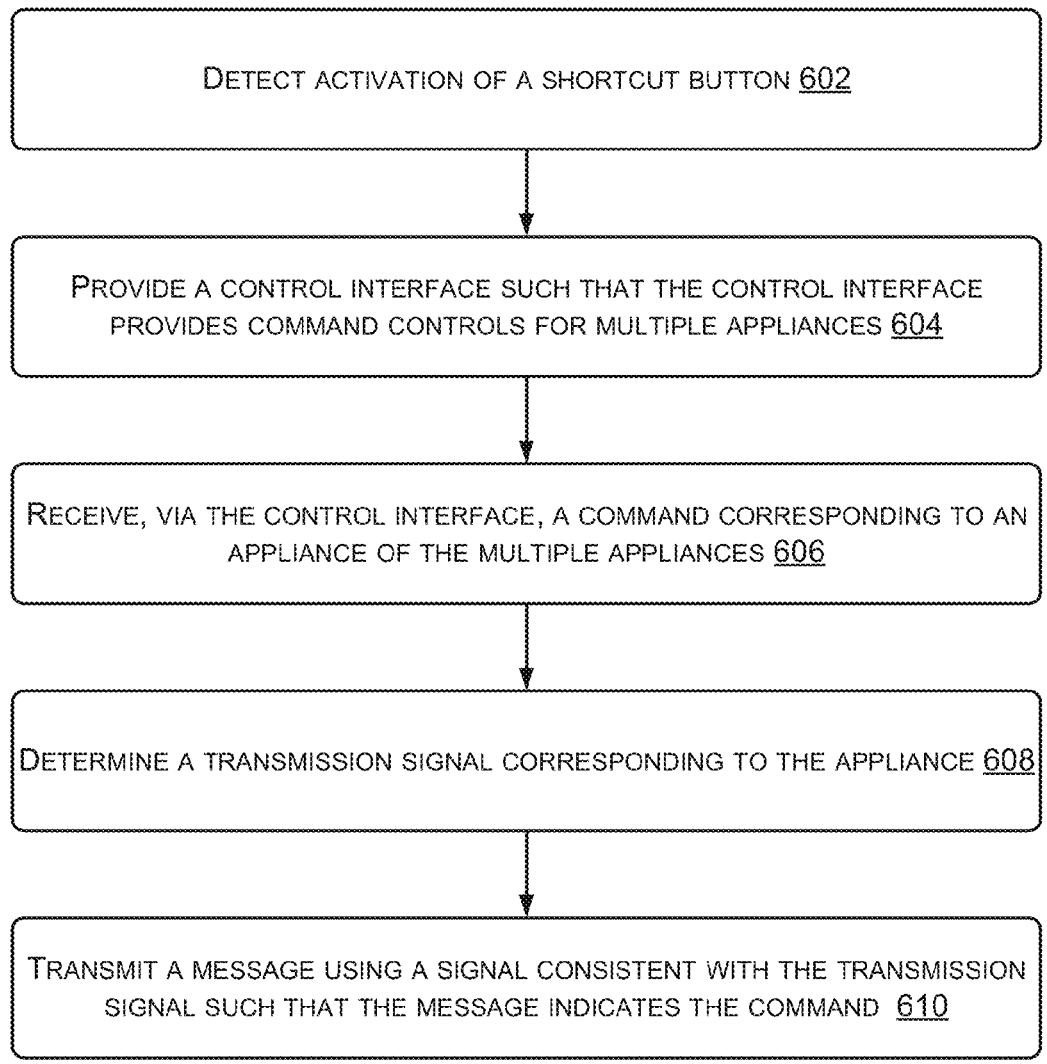
FIG. 6 illustrates a flow diagram depicting a method for detecting and responding to a device button with a display of a control interface for receiving and transmitting commands in accordance with some embodiments.

FIG. 6 illustrates a flowchart that includes representative operations performed by an appliance control component in conjunction with a signal from or corresponding to a physical design feature, such as a shortcut button. In the flow diagram of FIG. 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

In this example, a user may activate a physical design element of a device, where the physical design element may be a shortcut button, and the appliance control component may detect activation of the shortcut button, as depicted at 602. For example, the activation may correspond to a user applying physical pressure to the physical design element of the device, such as pressing the shortcut button.

For example, the activation of the button may generate a signal that is provided to the appliance control component, and resulting in the appliance control component detecting activation of the shortcut button. In other cases, the generated signal may be provided to an operating system of the device, where the operating system may determine that the signal corresponds to the appliance control component, and where the operating system may then generate a signal or otherwise invoke the appliance control component.

This transition from the operating system handling the signal from the shortcut button to invocation of the appliance control component may occur without a user seeing any other operating system or application processes on the device. In other words, the user may press the shortcut button and immediately and directly see the control interface provided by the appliance control component.

In response to detecting activation of the shortcut button, the appliance control component may provide a control interface such that the control interface provides one or more command controls for multiple appliances, as depicted at 604, and as depicted in control panel 106 of FIG. 1A. As noted above, the control interface may be provided directly from a dormant state, or the control interface may replace a currently active application or operating system process on the device.

The appliance control component may receive a selection of a command via the control interface, for example, a user may select a user interface element of the control interface that corresponds to a feature of a currently selected appliance, as depicted at 606. Based at least in part on the selected command, the appliance control component may determine how to format a message to include an indication of the selected command for the currently selected appliance of the control panel.

Further the appliance control component may determine a wireless protocol and/or signal that may be implemented on the appliance for which the selected command is intended. This determination is depicted at 608. For example, different commands for different appliances may correspond to different formats for control commands for a given appliance, and the appliance control component may store and index commands corresponding to particular brands and models of appliances.

The appliance control component may then send a transmission signal to the appliance, where the transmission signal is consistent with the determined wireless protocol and/or signal, and where the transmission includes a message indicating the selected command, as depicted at 610. In this way, a user using a single control interface integrating controls for multiple appliances may easily, and seamlessly, in response to activation of a physical design feature of a device, control multiple different appliances.

In other examples, as discussed above with regard to FIGS. 2A and 2B, the appliance control component may, in response to a single given detection of a control button in a control panel interface of the appliance control component, send multiple different commands to multiple different appliances.

Figure 7:
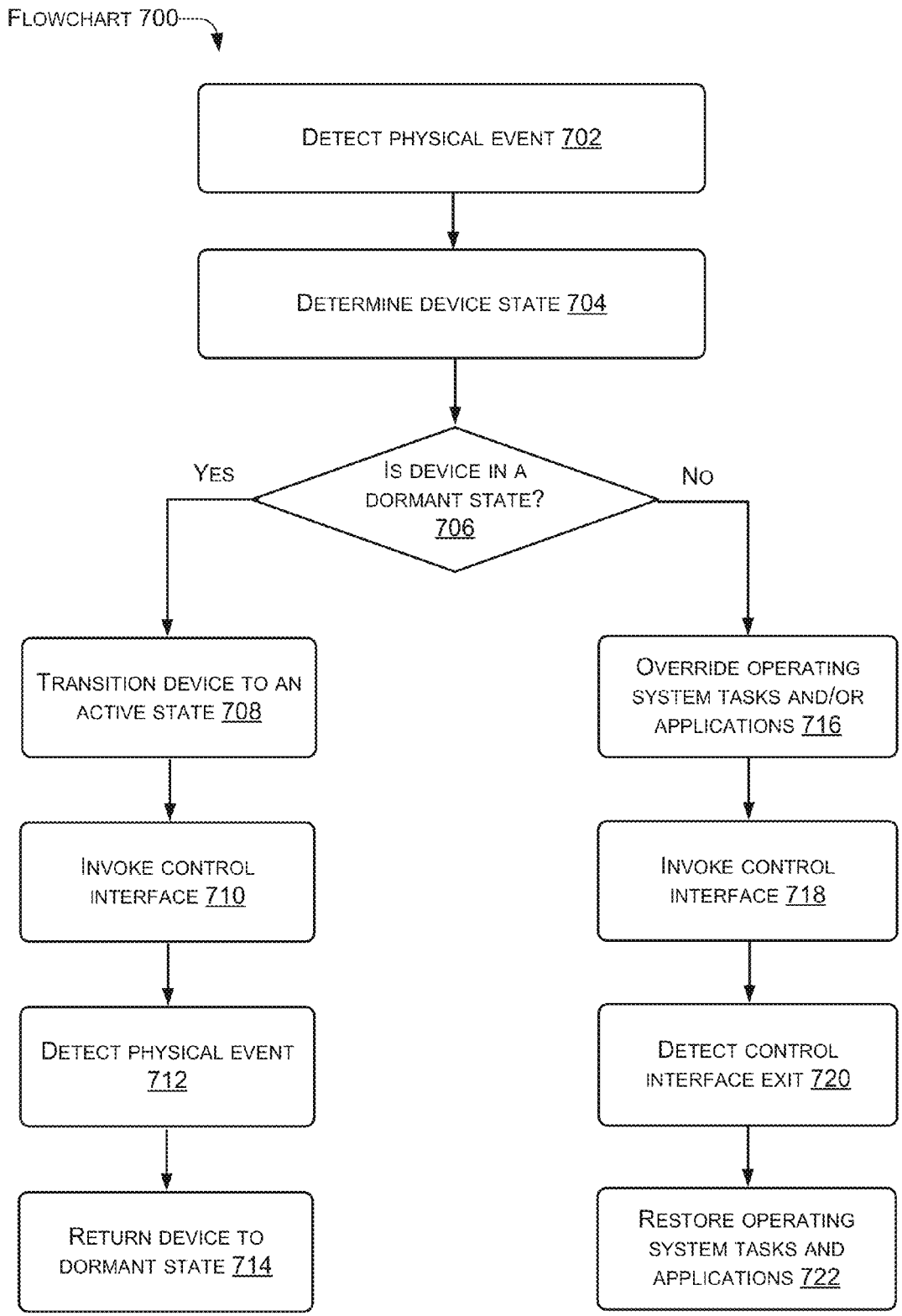
FIG. 7 illustrates a flow diagram depicting control flows corresponding to an appliance control component in accordance with some embodiments.

FIG. 7 illustrates a flowchart 700 that includes representative operations performed by an appliance control component in transitioning between various different states. In flowchart 700, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

As noted elsewhere, a device may be in a dormant state, a sleep mode, or other power-saving mode, and in any of these modes or states, in response to activation of a physical design element, invoke the appliance control component. Further, the device may be active and the device operating system may have one or more active processes, and in this active state, in response to activation of a physical design element, invoke the appliance control component.

In this example, these operations are depicted in flowchart 700, where a device operating system or appliance control component may detect a physical event, such as activation of a physical design element, as depicted at 702. At this point, a determination is made as to the state of the device, as depicted at 704 and 706.

In the case that the device is in a dormant state, a sleep state, or some other type of low-power state, then the device is transitioned to an active state, as depicted at 708. Further, after the device is transitioned to an active state, a control interface for the appliance control component may be invoked, as depicted at 710. In this way, the appliance control component may operate independently of other operating system tasks or applications. In some embodiments, the appliance control component may block out or disable some or all functionality of other applications during the time that the appliance control component is active. In other cases, the appliance control component may be in an active state while other operating system tasks or applications may perform some functions as background processes of the operating system. Example operations of the appliance control component that may be performed at this point are discussed above with regard to, at least, FIGS. 1-6.

Otherwise, if the device is not in a dormant state, a sleep state, or some other type of low-power state, then any current active operating system processes and/or any active applications that may be executing may be transitioned to background processes or transitioned to a dormant mode, as depicted at 716. Further, after the operating system processes and/or applications are transitioned to a dormant mode, a control interface for the appliance control component may be invoked, as depicted at 718. Example operations of the appliance control component that may be performed at this point are discussed above with regard to, at least, FIGS. 1-6.

In this way, regardless of a current device state or operating system state, in direct and immediate response to activation of the physical design element of the device, a control interface for the appliance control component may be displayed and presented to a user for controlling one or more appliances.

In this example, a user may proceed to interact with and control one or more appliances, and afterward, the user may exit the control interface through multiple different ways. For example, a user may depress a "Home" button on the device to place the control interface in the background, a user may press a power button on the device, a user may select a user interface element within the control interface to exit the control interface.

In this example, where the device was not in a dormant state when the appliance control component was invoked, in response to an exit of the control interface of the appliance control component, the user may also activate the physical design element of the device, as depicted at 720. In this example, in response to the exit from the control interface of the appliance control component, the previously executing operating system tasks and/or applications may be restored, as depicted at 722.

However, in the case that the appliance control component is invoked from the dormant state, then the device, in response to activation of the physical design element, may again return to the dormant state, as depicted at 712 and 714. Further, in this example, if, instead of activating the physical design element, the user exits the control interface through a menu selection, or activation of a "Home" button, then the device may remain in an active state and the control interface of the appliance control component may be transitioned to a background process.

Figure 8:
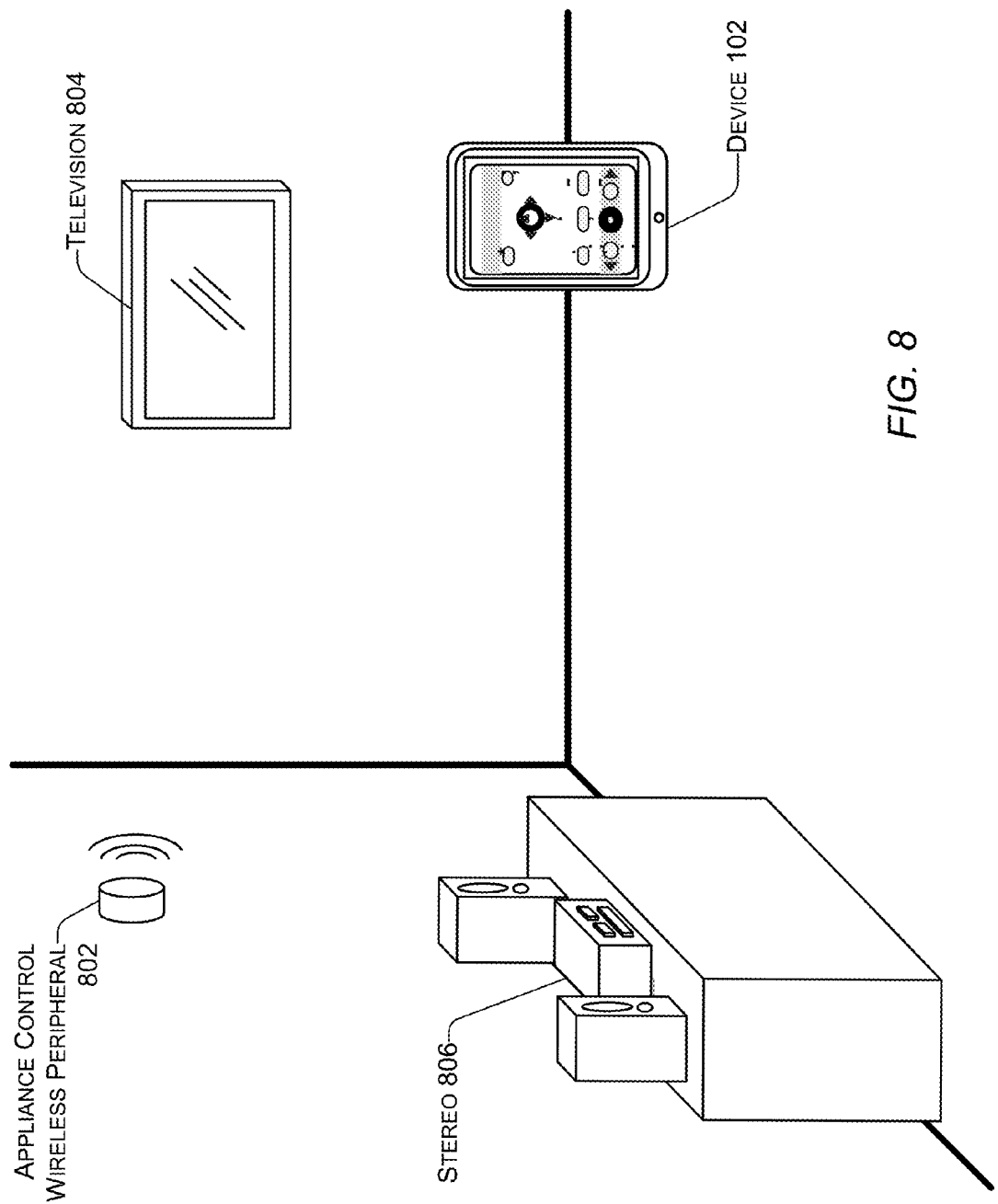
FIG. 8 illustrates an appliance control wireless peripheral configured to operate in conjunction with an appliance control component according to some embodiments.

FIG. 8 illustrates an example device 102 that may operate either locally or remotely with an appliance control peripheral such as appliance control peripheral 802. For example, in some cases, the power and reach of an antenna within device 102 may result in weak transmissions. In such a case, device 102 may communicate with the appliance control peripheral via one wireless protocol, and the appliance control peripheral may communicate the appliance control component and with one or more appliances via one or more other wireless protocols, including the wireless protocol used to communicate with device 102.

For example, device 102 may, from either a local or remote location, control one or more appliances that communicate with wireless protocols that may have a limited wireless range or that may be restricted to line-of-sight wireless protocols. For example, if a television 804 or stereo 806 only accepts IR wireless commands, and if device 102 is with a user at a location outside of the IR wireless range, such as in a different part of town, or in the driveway of the house, device 102 may still provide commands to the stereo 806 with appliance control wireless peripheral 802 serving as an intermediary device to relay the commands from device 102 to stereo 806.

In this example, a user may then create a rule for the appliance control component such as "when I approach the house after 5 pm, turn on the stereo to Blues music station 100.5". In some cases, the appliance control component may provide an rule creation interface. In other examples, the appliance control component may, after multiple detections of the user turning on music station 100.5 upon arriving at the house, infer such a rule. For example, the appliance control component may use geolocation information as a factor as a basis for determining appliance control rules, in addition to or instead of other factors discussed elsewhere.

In some embodiments, a user may add a correspondence between an existing physical design element of a device and the appliance control component, where the appliance control component may use the wireless functionality of a appliance control wireless peripheral. For example, upon installation of an application for the appliance control component, a user may specify that a double press of a device power button may be associated with invocation of the appliance control component. In this way, upon invocation, the appliance control component may use the wireless functionality of appliance control wireless peripheral 802 to communicate with one or more appliances even through the device 102 itself may not support all of the wireless protocols to communicate with the one or more appliances controlled by the appliance control component.

In some embodiments, the appliance control wireless peripheral 802 may include some of the functionality of the appliance control component. For example, the appliance control wireless peripheral 802 may receive a transmission from an appliance control component that indicates one or more commands to be issued to one or more appliances. In this example, the appliance control wireless peripheral 802 may determine corresponding transmission signals and protocols that may be needed to transmit the one or more commands to the one or more appliances, where the transmissions of the one or more commands are consistent with the determined transmission signals corresponding to the one or more appliances.

Figure 9A:
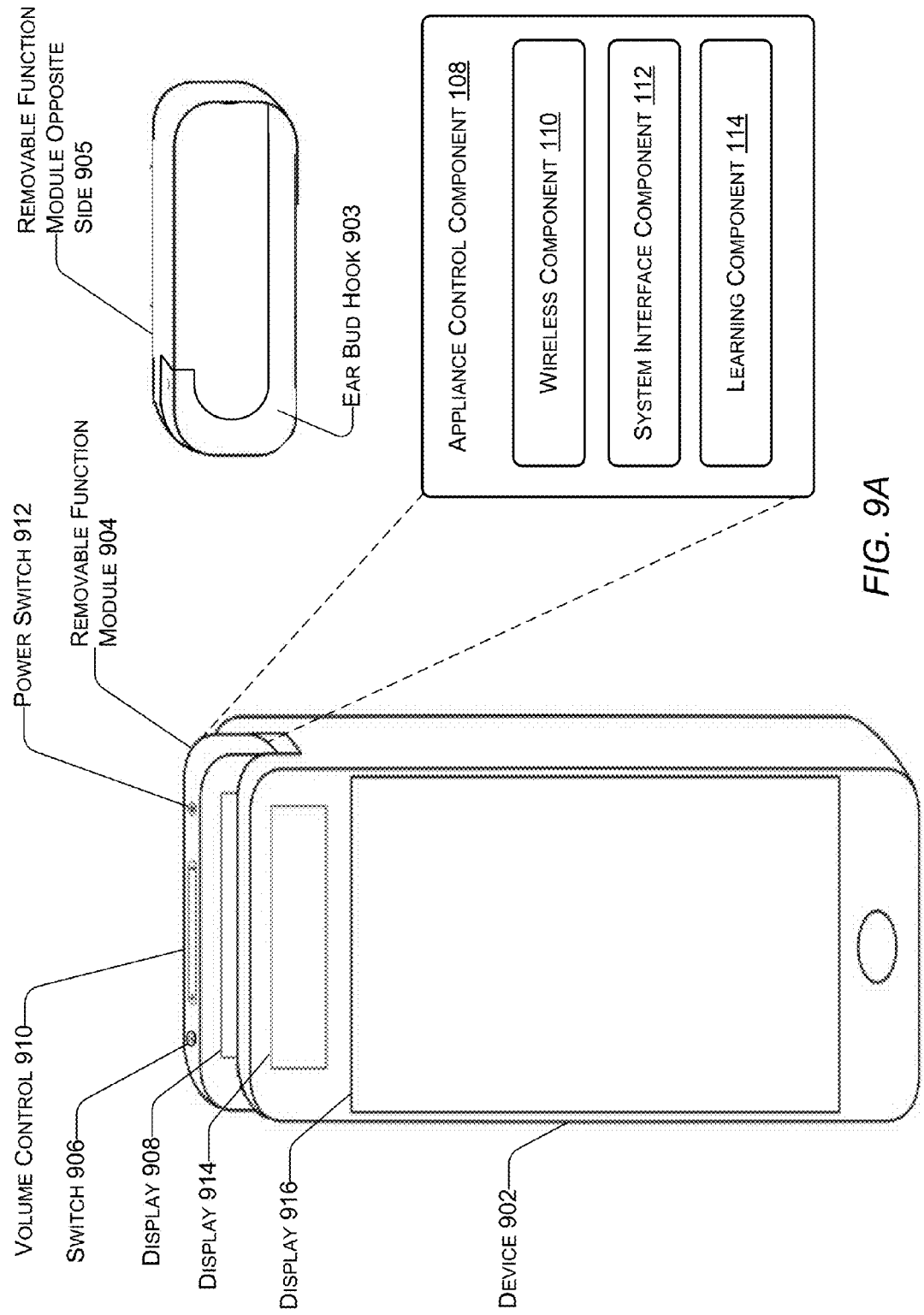
FIGS. 9A-9C illustrate example features of an example device configured to include an example removable function module according to some embodiments.
Figure 9B:
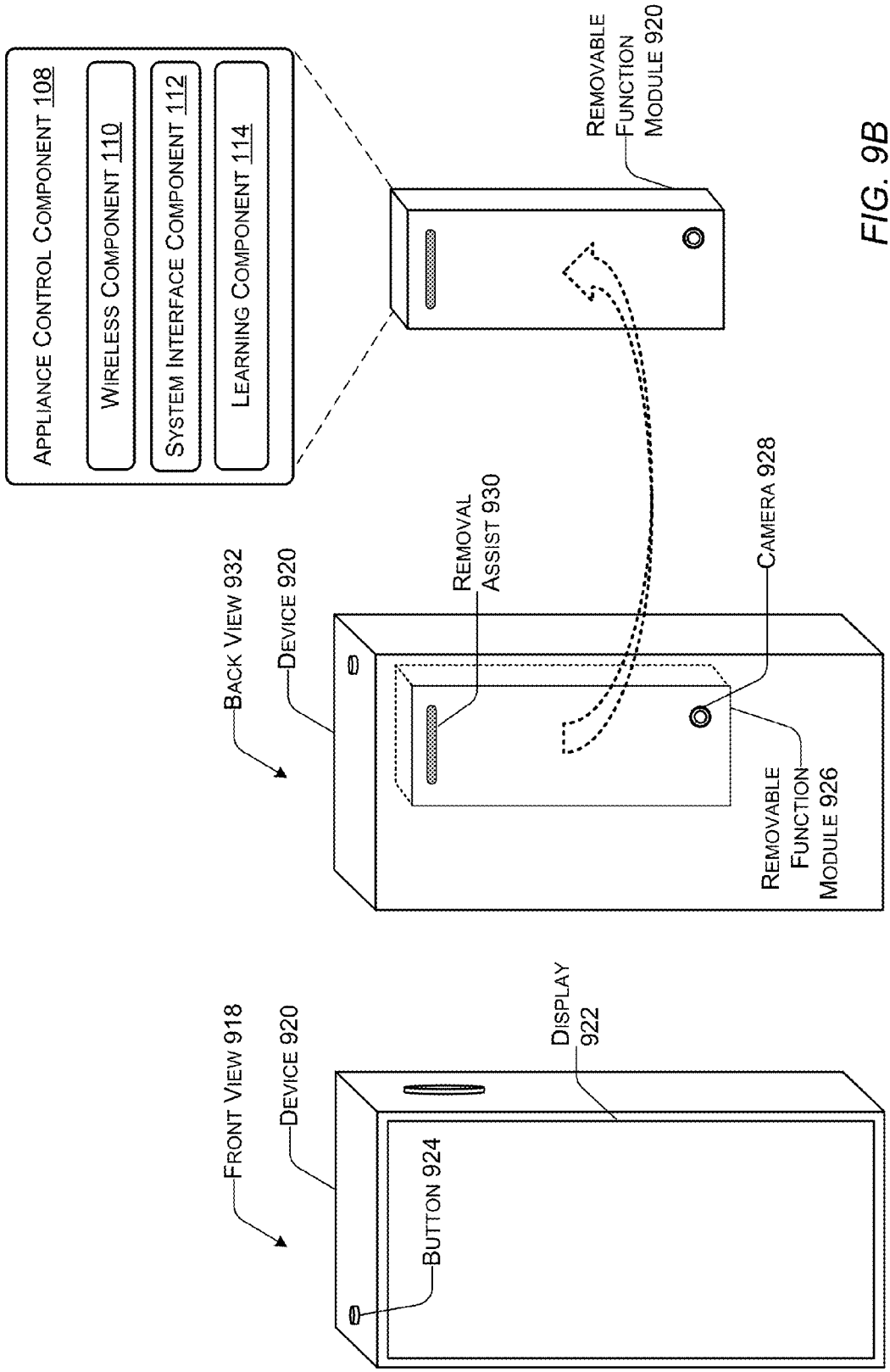
Figure 9C:
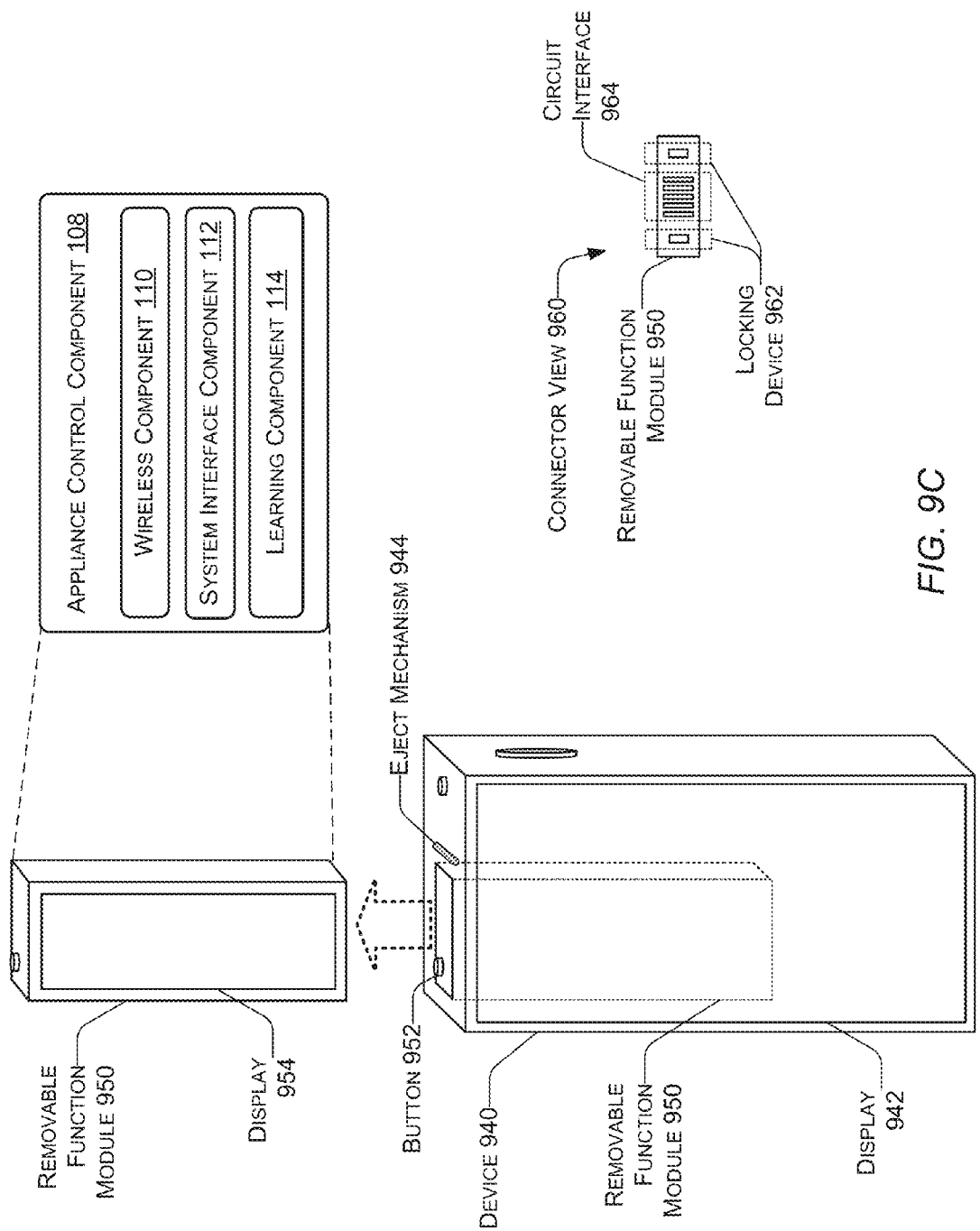

FIGS. 9A-9C illustrate example devices designed to accommodate various embodiments of a removable function module that implement embodiments of an appliance control component.

FIG. 9A illustrates device 902, which may be designed to fit or accommodate the dimensions of removable function module 904. Removable function module 904 may also include one or more contacts corresponding to one or more contacts in device 902 such that removable function module 904 may lock in to place within the space of device 902.

In some cases, removable function module 904 may lock in to place with magnetic contacts. In other cases, removable function module 904 may include a pin connector and device 902 may include a corresponding female connection. In other cases, a different type of mechanism may lock removable function module 904 in to place within device 902, where when removable function module 904 is in a locked position, an interface between connectors of removable function module 904 and device 902 is enabled.

In some embodiments, removable function module 904 may include a volume control mechanism such as volume control 910 and a display such as display 908. Further, in this implementation, removable function module 904 may include a switch 906, which may operate similarly to switch 404 described with regard to FIG. 4.

In other examples, instead of switch 906, removable function module 904 may include a button, such as button 104 described with regard to FIG. 1A. In other examples, instead of switch 906, removable function module 904 may include another type of physical input mechanism configured to detect and receive tactile user input.

In some embodiments, removable function module 904 may include a power switch 912 that may power down, power up, or enable/disable a dormant state either when removable function module 904 is connected to device 902 or when removable function module 904 is disconnected from a device and operating independently. In some cases, when removable function module 904 is connected to device 902, content that would otherwise be displayed on display 908 may be displayed in display 914 of device 902.

Further in this example, when removable function module 904 is connected to device 902, the appliance control component implemented within removable function module 904 may interface with and display a control interface, such as control panel 106 of FIG. 1A, within display 916. In this example, if the removable function module 904 is connected to device 902, then display 908 may be deactivated and all visual content that would be displayed in display 908 may instead be transmitted from removable function module 904 to device 902 for display within display 914.

In this example, an intelligent terminal such as device 902 may be equipped with removable function module 904. Device may include a main screen such as display 916 and a withdrawing apparatus as part of the device body. The withdrawing apparatus of device 902 may be installed with a power supply interface and a data exchange interface, and display 916 may also be a touchable screen. In some examples, when removable function module 904 is attached to the withdrawing apparatus of device 902, data exchange between device 902 and removable function module 904 may be achieved via the data exchange interface.

However, in other examples, when the removable function module 904 separates from the withdrawing apparatus of device 902, the data exchange between the main screen device and the removable function module may be achieved via any wireless communication, including Bluetooth. In some embodiments, removable function module 904 may include a power supply that may recharge when connected to device 902. Further, when the removable function module 904 is separate from the withdrawing apparatus of the device 902, removable function module 904 may be worn from an ear, where the ear bud hook 903 may swivel from a locked position (displayed) into an extended position (not displayed), as depicted the opposite side view of removable function module opposite side 905. In this way, removable function module 904 may be an independent Bluetooth device, or a wearable device using some other wireless protocol, including protocols for communicating via cellular phone networks. In other words, the removable function module 904 may serve as an independent, cellular device.

FIG. 9B illustrates a front view 918 device 920 with a display 922 and button 924, where device 920 may be designed to fit or accommodate the dimensions of removable function module 926. Removable function module 926 may also include one or more contacts corresponding to one or more contacts and locking mechanisms such that removable function module 926 may lock in to place within the space of device 920.

In some cases, removable function module 926 may lock in to place with magnetic contacts. In other cases, removable function module 926 may include a pin connector and device 920 may include a corresponding female connection. In other cases, a different type of mechanism may lock removable function module 926 in to place within device 920, where when removable function module 926 is in a locked position, an interface between connectors of removable function module 920 and device 926 is enabled.

In some embodiments, removable function module 926 may include a volume control mechanism and a display. In this example, as depicted in back view 932, removable function module 926 includes a camera, camera 928, and also includes a removal assist mechanism, removal assist 930. In one example, removal assist 930 may be a cavity allowing a user to establish a hold and pull on the removable function module. In another example, removal assist 930 may a depressible eject mechanism.

Further, in this implementation, removable function module 926 may operate in conjunction with button 924 of device 920, which together may operate to implement an appliance control component according to embodiments described elsewhere.

In some embodiments, removable function module 926 may include a power switch that may power down, power up, or enable/disable a dormant state either when removable function module 926 is connected to device 920 or when removable function module 926 is disconnected from a device and operating independently.

Further in this example, when removable function module 926 is connected to device 920, the appliance control component implemented within removable function module 926 may interface with and display a control interface, such as control panel 106 of FIG. 1A, within display 922.

In this example, an intelligent terminal such as device 920 may be equipped with removable function module 926. Device 920 may include a withdrawing apparatus as part of the device body. The withdrawing apparatus of device 920 may be installed with a power supply interface and a data exchange interface, and display 922 may also be a touchable screen. In some examples, when removable function module 926 is attached to the withdrawing apparatus of device 920, data exchange between device 920 and removable function module 926 may be achieved via the data exchange interface.

However, in other examples, when the removable function module 926 separates from the withdrawing apparatus of device 920, the data exchange between the main screen device and the removable function module may be achieved via wireless communication. In some embodiments, removable function module 926 may include a power supply that may recharge when connected to device 920.

FIG. 9C illustrates a device 940 with a display 942 and eject mechanism 944, where device 940 may be designed to fit or accommodate the dimensions of removable function module 950. Removable function module 950 may also include one or more contacts corresponding to one or more contacts and locking mechanisms such that removable function module 950 may lock in to place within the space of device 940. In one example, eject mechanism 944 may be a depressible eject mechanism allowing a user to eject removable function module 950.

In some cases, removable function module 950 may lock in to place with magnetic contacts. In other cases, removable function module 950 may include a pin connector and device 940 may include a corresponding female connection. In other cases, a different type of mechanism may lock removable function module 950 in to place within device 940, where when removable function module 950 is in a locked position, an interface between connectors of removable function module 950 and device 940 may be established.

In some embodiments, removable function module 950 may include a button, such as button 952 and a display, such as display 954. Further in this example, when removable function module 950 is connected to device 940, the appliance control component implemented within removable function module 950 may interface with and display a control interface, such as control panel 106 of FIG. 1A, within display 942. In this example, if the removable function module 950 is connected to device 940, then display 954 may be deactivated and all visual content that would be displayed in display 954 if removable function module 950 were operating independently may instead be transmitted from removable function module 950 to device 940 for display within display 942.

In some implementations, as depicted in connector view 960 of removable function module 950, removable function module 950 may include a locking device, locking device 962, where locking device 962 is designed to lock in to a corresponding locking mechanism of device 940. Further, in this example, removable function module 950 may include a circuit interface 964 for making contact with a corresponding circuit interface of device 940, and where circuit interface 964 may implement a data exchange and/or power charging functions in response to being connected to device 940.

Further, in this implementation, removable function module 950 may receive input from button 952 to operate to implement an appliance control component according to embodiments described elsewhere. In different embodiments, button 952 may be any of the types of physical design elements discussed elsewhere for receiving user input for invoking an appliance control component.

In some embodiments, removable function module 950 may include a power switch that may power down, power up, or enable/disable a dormant state either when removable function module 950 is connected to device 940 or when removable function module 950 is disconnected from a device and operating independently.

Further in this example, when removable function module 950 is connected to device 940, the appliance control component implemented within removable function module 950 may interface with and display a control interface, such as control panel 106 of FIG. 1A, within display 942 of device 940 when removable function module 950 is operating with device 940, and within display 954 when removable function module 950 is operating independently of any other device.

In this example, an intelligent terminal such as device 940 may be equipped with removable function module 950. Device 940 may include a withdrawing apparatus as part of the device body. The withdrawing apparatus of device 940 may be installed with a power supply interface and a data exchange interface, and display 942 may also be a touchable screen. In some examples, when removable function module 950 is attached to the withdrawing apparatus of device 940, data exchange between device 940 and removable function module 950 may be achieved via the data exchange interface.

However, in other examples, when the removable function module 950 separates from the withdrawing apparatus of device 940, the data exchange between the main screen device and the removable function module may be achieved via wireless communication. In some embodiments, removable function module 950 may include a power supply that may recharge when connected to device 940.

Figure 10:
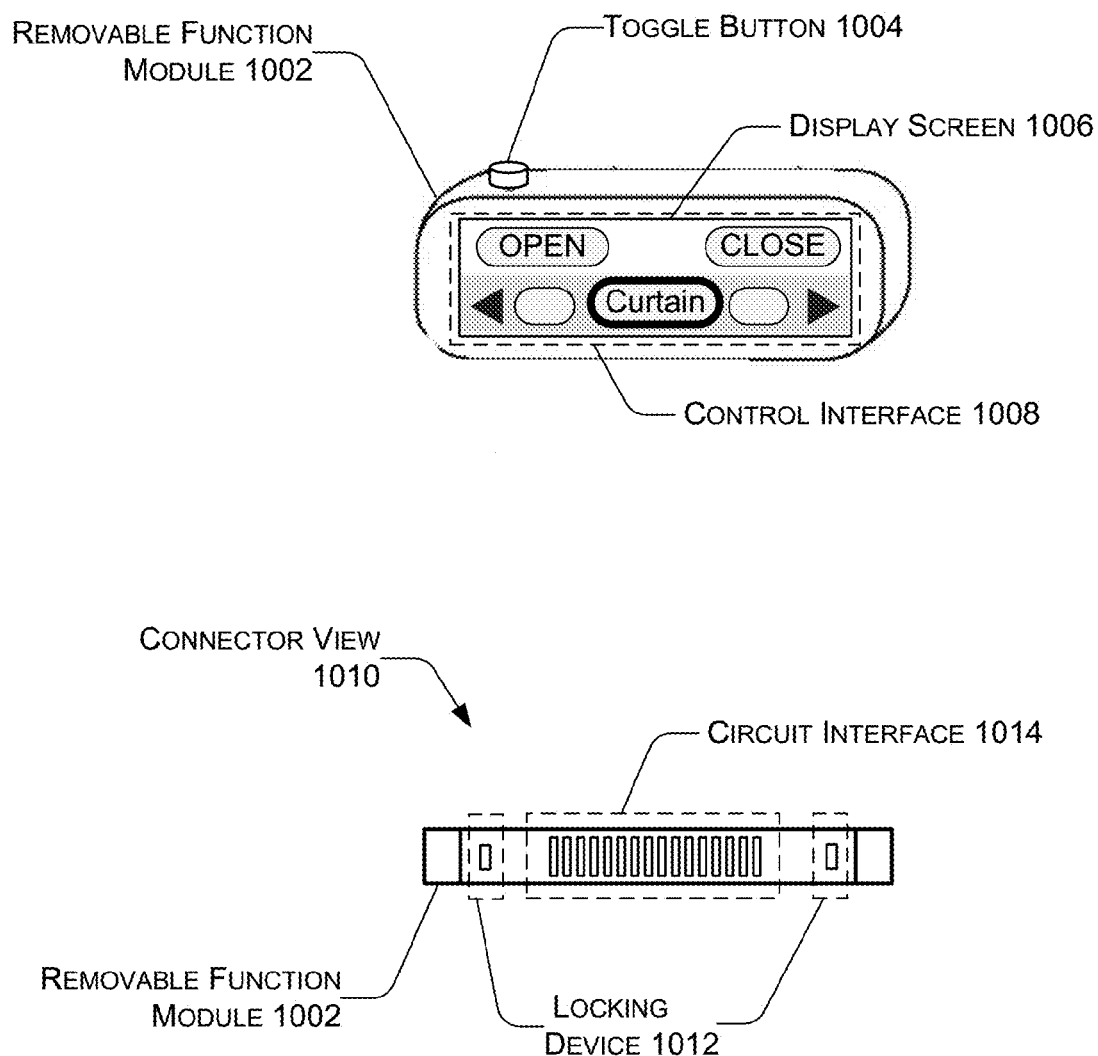
FIG. 10 illustrates example features of another example removable function module according to some embodiments.

FIG. 10 illustrates a removable function module 1002 independent of a device. In the case where the removable function module 904 is disconnected from a mobile device, a display screen 1006 may display a control interface 1008 that may be formatted for the dimensions of display screen 1006. For example, control interface 1008 may include a scaled down version of a full control interface. In other example, control interface 1008 may include fewer user interface elements, such as control buttons, different icons, differently sized icons, or other modifications to the user interface elements of the control interface to provide for an uncluttered interface given the reduced screen dimensions.

In some examples, in the case that removable function module 1002 is not connected to a device, it may be considered to be in an offline state. In an offline state, the removable function module may independently carry out all or some function operation or information collection, and store data in an internal memory of removable function module 1002. When the removable function module 1002 resumes the online state, for example in response to being connected with a device, the screen for the device may read and handle data from the removable function module, and achieve data exchange or transfer with the removable function module.

In this embodiment, removable function module 1002 includes a toggle button 1004. However, in other cases, removable function module 1002 may include another type of physical design element suitable for detecting and identifying manually generated user input in order to correspondingly generate a signal to invoke an appliance control component.

In some embodiments, removable function module 1002 may be provided with Bluetooth headset, remote control, camera, smart wearable device, intelligent peripherals, multimedia players, smart peripherals, smart IC card, remote controller and intelligent scanner, including but not limited to physical buttons, display screen, Bluetooth, Wi-Fi, camera, MIC, telephone receiver, GPS, motion sensors, environmental sensors, biosensors, image sensors, infrared radiation, NFC, memory, 3.5 mm headphone jack and so on.

As depicted in connector view 1010 of removable function module 1002, removable function module 1002 may include a locking device 1012, where locking device 1012 is designed to lock in to a corresponding locking mechanism of a device. Further, in this example, removable function module 1002 may include a circuit interface 1014 for making contact with a corresponding circuit interface of a device, and where circuit interface 1014 may implement a data exchange and/or power charging functions in response to being connected to a device, such as device 902 depicted in FIG. 9.

Figure 11:
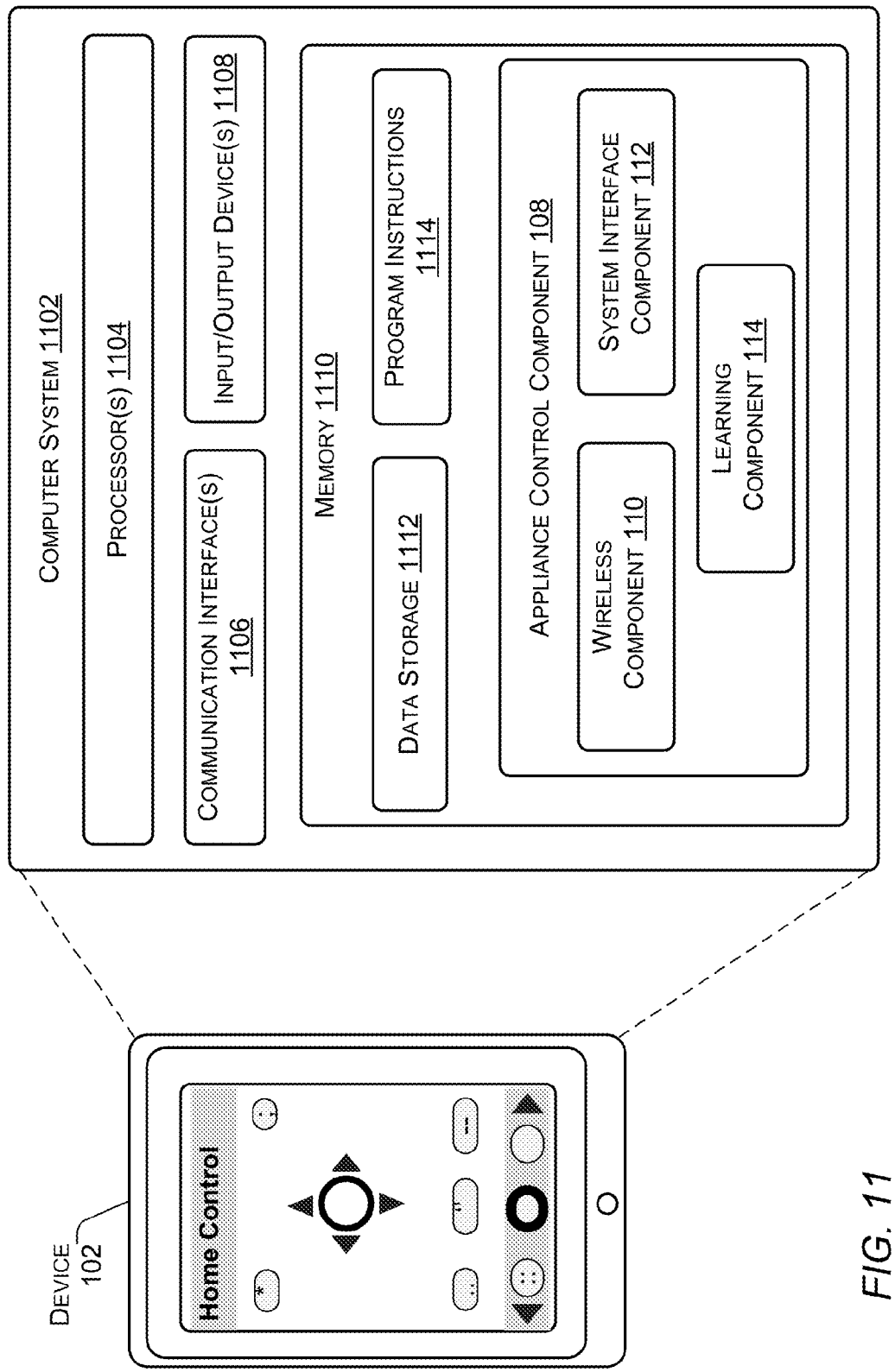
FIG. 11 illustrates a first computer system configured to implement an appliance control component according to some embodiments.

FIG. 11 illustrates an example computer system, computer system 1102, within device 102, where computer system 1102 may be configured to implement an appliance control component according to the discussed embodiments. Computer system 1102 may be implemented in different devices described herein, such as device 102 depicted in FIG. 1A. Generally, computer system 1102 may be implemented in any of various types of devices, including, but not limited to, a personal computer system, desktop computer, laptop, notebook, or netbook computer, handheld computer, a mobile device, a consumer device, video game console, handheld video game device, or in any type of computing or electronic device.

In one implementation, computer system 1102 includes one or more processors 1104 coupled to memory 1110. The processor(s) 1104 can be a single processing unit or a number of processing units, all of which can include single or multiple computing units or multiple cores. The processor(s) 1104 can be implemented as one or more microprocessors, microcomputers, microcontrollers, digital signal processors, central processing units, state machines, logic circuitries, and/or any devices that manipulate signals based on operational instructions. As one non-limiting example, the processor(s) 1104 may be one or more hardware processors and/or logic circuits of any suitable type specifically programmed or configured to execute the algorithms and processes described herein. Among other capabilities, the processor(s) 1104 can be configured to fetch and execute computer-readable instructions stored in the memory 1110 or other computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

By contrast, communication media may embody computer-readable instructions, data structures, program modules, or other data in a modulated data signal, such as a carrier wave, or other transmission mechanism. As defined herein, computer storage media does not include communication media.

The memory 1110, including data storage 1112, is an example of computer storage media. Further, computer system 1102 may include one or more communication interfaces 1106 that may facilitate communications between computing devices. In particular, the communication interfaces 1106 may include one or more wired network communication interfaces, one or more wireless communication interfaces, or both, to facilitate communication via one or more networks represented by a network. The network may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, computer system 1102 may include input/output devices 1108. The input/output devices 1108 may include a keyboard, a pointer device, (e.g. a mouse or a stylus), a touch screen, one or more image capture devices (e.g. one or more cameras), one or more microphones, a display, speakers, and so forth.

In some implementations, the invention may be implemented using a single instance of a computer system, while in other implementations, the invention may be implemented on multiple such systems, or multiple nodes making up a computer system may be configured to host different portions or instances of implementations. For example, in one implementation some elements may be implemented via one or more nodes of the computer system that are distinct from those nodes implementing other elements.

The memory 1110 within the computer system 1102 may include program instructions 1114 configured to implement each of the implementations described herein. In one implementation, the program instructions may include software elements of implementations of the modules discussed herein. The data storage within the computer system may include data that may be used in other implementations.

Figure 12:
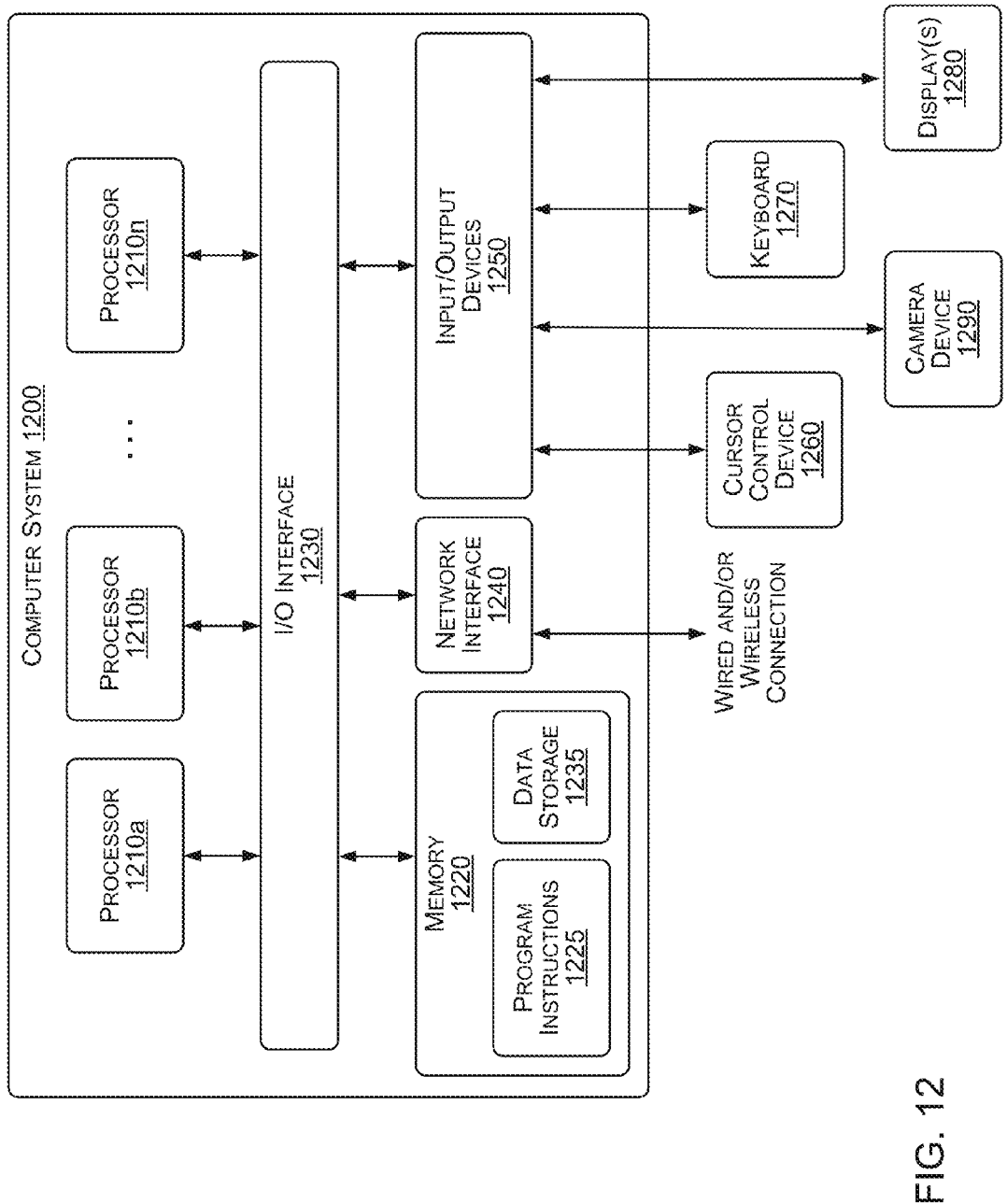
FIG. 12 illustrates a second computer system configured to implement an appliance control component according to some embodiments.

FIG. 12 illustrates another example computer system, computer system 1200, where computer system 1200 may be configured to implement an appliance control component according to the discussed embodiments. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 1200 includes one or more processors 1210*a*-1210*n* coupled to system memory 1220 via input/output (I/O) interface 1230. The computer system further includes network interface 1240 coupled to I/O interface 1230, and one or more input/output devices 1250, such as cursor control device 1260, keyboard 1270, camera device 1290, and one or more displays 1280. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 1220 as program instructions 1225 and data storage 1235, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A removable function module comprising:
one or more processors;
a transmitter;
a button;
an appliance control component configured to:
   detect activation of the button;
   provide a control interface such that the control interface provides command controls for multiple appliances;
   receive, via the control interface, a command corresponding to an appliance of the multiple appliances; and
   determine a transmission signal corresponding to the appliance;
a wireless component configured to:
   transmit, via the transmitter, a message using a signal consistent with the transmission signal such that the message indicates the command;
wherein the removable function module is configured to lock into and withdraw from a mobile terminal; and
a display configured to deactivate when the removable function module is locked into the mobile terminal.

2. The removable function module of claim 1, wherein the removable function module comprises a circuit interface, and wherein to provide the control interface the appliance control component is further configured to:
   establish communication with the mobile terminal via the circuit interface; and
   provide, via the circuit interface, the control interface for display on a display screen of the mobile terminal.

3. The terminal of claim 2, wherein the control interface provided to the mobile terminal is scaled differently than a control interface provided to the display screen of the removable function device.

4. The terminal of claim 3, wherein the control interface provided to the display screen includes a differently configured layout of command controls and includes one or more different command controls.

* * * * *